United States Patent [19]
Luitje

[11] Patent Number: 4,779,213
[45] Date of Patent: Oct. 18, 1988

[54] ELECTRONIC DIGITAL SPEEDOMETER FOR A MULTI-MEASURAND DATA COMMUNICATION SYSTEM

[75] Inventor: William V. Luitje, Ann Arbor, Mich.

[73] Assignee: Chrysler Motors Corporation, Highland Park, Mich.

[21] Appl. No.: 54,648

[22] Filed: May 27, 1987

[51] Int. Cl.⁴ .............................................. G01P 3/48
[52] U.S. Cl. ................................. 364/565; 324/166; 377/20
[58] Field of Search ....................... 364/426, 565, 569; 324/160, 166; 377/15, 16, 19, 20, 23–26

[56] References Cited

U.S. PATENT DOCUMENTS

| 3,936,663 | 2/1976 | Taylor et al. | 324/166 |
| 4,257,005 | 3/1981 | Hall | 324/166 |
| 4,430,612 | 2/1984 | Onitsuka et al. | 324/166 |
| 4,485,452 | 11/1984 | Cording et al. | 364/565 |
| 4,648,104 | 3/1987 | Yachida et al. | 364/565 |
| 4,667,297 | 5/1987 | Kawai | 364/565 |

FOREIGN PATENT DOCUMENTS

| 59-95467 | 6/1984 | Japan | 324/166 |
| 2159955 | 12/1985 | United Kingdom | 324/166 |

Primary Examiner—Vit W. Miska
Attorney, Agent, or Firm—Wendell K. Fredericks

[57] ABSTRACT

A firmware/hardware electronic digital speedometer connected to a vehicle multi-measurand data communications system maintains virtually no flicker in the display of digital numbers in a digital display unit such as a vacuum fluorescent display during movement of a vehicle when no change in speed is apparent. A speed sensor supplies speed information to a first computing unit which establishes an accumulated count of speed during a first interval. Then the first computing unit supplies over a communications link the speed count to a second computing unit at a rate that approximates the update rate of the display unit. The second computing unit processes the speed data in a particular manner to effect the virtually flicker-free updating of the display and improved accuracy.

12 Claims, 2 Drawing Sheets

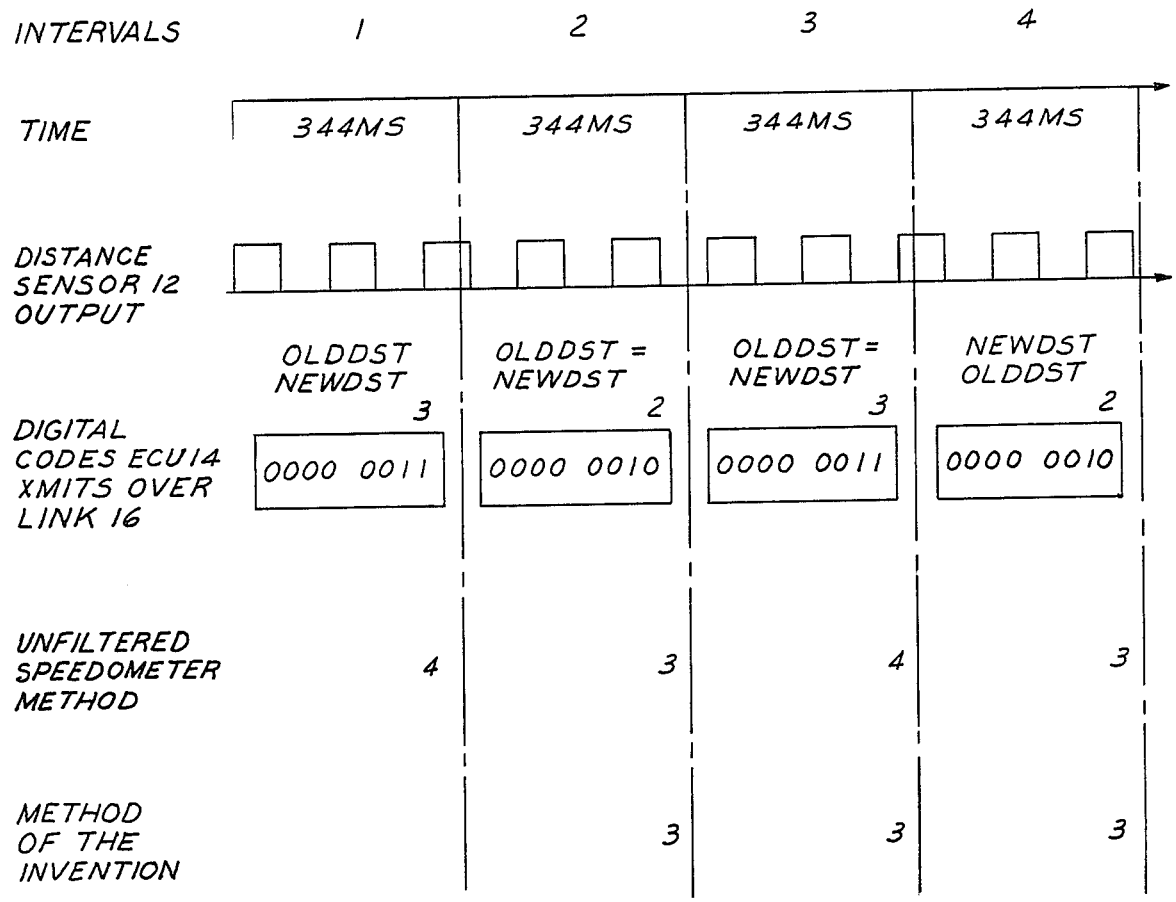

ELECTRONIC DIGITAL SPEEDOMETER FOR A MULTI-MEASURAND DATA COMMUNICATION SYSTEM

BACKGROUND OF THE INVENTION

1. Field of the Invention

This invention relates to indicating techniques of vehicle speed, and more particularly in a preferred embodiment to methods and apparatus for evaluating speed signals placed on a serial data communications link and for using such data to provide digitally indicated vehicle speed information on a display.

2. Description of the Prior Art

In prior art digital speedometer systems, such as the ones described in the article entitled "Microprocessor Control for Liquid Crystal Instrument Panel" by O. Shimizu, H. Gotoh, and H. Arai appearing as paper No. 820101 (P-103) of SAE's Electronic Displays and Information Systems and On-Board Electronics (referred to as the Shimuzu arrangement) and in the Article entitled "A Comprehensive Study of Digital Speedometer" by M. Moriyama, T. Kurovama and H. Shinkai appearing as paper No. 811419 of SAE Transaction Volume 90, (referred to as the Moriyama arrangement) require direct access to a speed sensor. This is in contrast to the present system wherein an engine control unit places information on the communications bus at predetermined intervals.

Both the Shimizu and Moriyama arrangements are the conventional type of electronic digital speedometers comprised of basically a timing pulse, means for generating gate, reset and latch signals at predetermined sequential intervals, a counter to count the number of speed pulses generated for a given gate time in proportion to the vehicle speed, a display driver to latch an output from the speed counter until the next succeeding count is completed and an indicator (LCD, vacuum fluorescent display, etc.) to digitally indicate the value latched by the display driver.

In both arrangements, steps had to be taken to alleviate a display flicker problem caused by the inconsistency in the timing of applying the gate signal in synchronization with the timing of counting the speed pulses.

In the Shimizu arrangement, software filtering (a continuous pulse interval averaging method) was employed to satisfy a flickering display as well as a fast response. A computer counts the number of pulses in 0.36 seconds, which is the display update cycle, and at the same time, it measures the time interval from the first pulse to the last pulse that is gated by the computer. From these two data, an average pulse interval is calculated. Then an algorithm is employed to calculate speed. The latest speed before filtering is determined by dividing the latest average pulse interval into a predetermined constant. The latest speed after filtering is calculated by summing the latest speed before filtering multiplied by another constant together with the product of the displayed speed and still another constant. But at very low speeds, the speed pulse in the Shimizu arrangement is so discrete that the software filtering method requires changes to yield appropriate display responses.

In the Moriyama arrangement, hardware is used to alleviate the gate/speed pulse synchronization and low speed problems encountered by the Shimizu arrangement. Such problems cause display flicker.

Both of the above arrangements employed techniques to resolve specific problems resulting from the limitations of the apparatus used to derive speed indications.

Another prior art solution to the flickering of the electronic dashboard display problem is described in an IEEE Transactions on Industrial Electronics, Vol. 1E-30, No. 2, May 1983. There, a software solution to minimize flickering of the display employs an algorithm that prevents changes in the displayed value of ±1.0 km/hr if the vehicle is driven at nearly constant speed.

Approximately every half second, the vehicle speed is measured by counting interrupt pulses generated by the speed sensor. The result is compared with the last displayed value of the road speed. If this comparison provides only a small and temporary difference between these two values, then the display is not changed. If there is a positive or negative difference for some measurement cycles, then the displayed speed is incremented or decremented. But if the comparison provides a very great difference e.g., acceleration, then the new vehicle speed is displayed immediately. This solution, a hysteresis approach, seems to be a step towards minimizing flicker but the inhibited changes in the display occurring with small and temporary differences in speed and the immediate update of the display due to acceleration might provide moments of uncertainty regarding the speed of the vehicle the amount of hystresis which controls the amount of flicker also appears to introduce an unavoidable error in the display. Hence the more flicker is reduced the larger the error could be.

BRIEF SUMMARY OF THE INVENTION

The present invention is concerned with an electronic digital speedometer system for determining vehicle speed from grounded switch closure signals provided by a distance sensor unit coupled to a drive train of the vehicle. The switch closure signals are converted to digital codes, each of which represents the number of switch closures occurring during a chosen time interval. A series of these digital codes are transmitted over a communication link at a sending rate identical to the update rate of the display. Means are connected to the link to receive the codes and for executing an algorithm which uses the codes to compute speed number values to be displayed. The processing of the codes, the execution of the algorithm and the transferring of the computed speed number values are performed in a manner that strikes a balance between updating the display slowly enough to make the displayed values readable and quickly enough to make the display responsive. At the same time, the display is kept stable enough so that it does not appear to jump around when no change in vehicle speed is apparent. It also yields an accurate speed indication.

The invention and its modes of operation will be more fully understood from the following detailed description when taken with the appended drawing figures in which:

BRIEF DESCRIPTION OF THE DRAWING

FIG. 3 is a timing diagram illustrative of the operation of the system.

DETAILED DESCRIPTION OF THE PREFERRED EMBODIMENT

Figure 1:
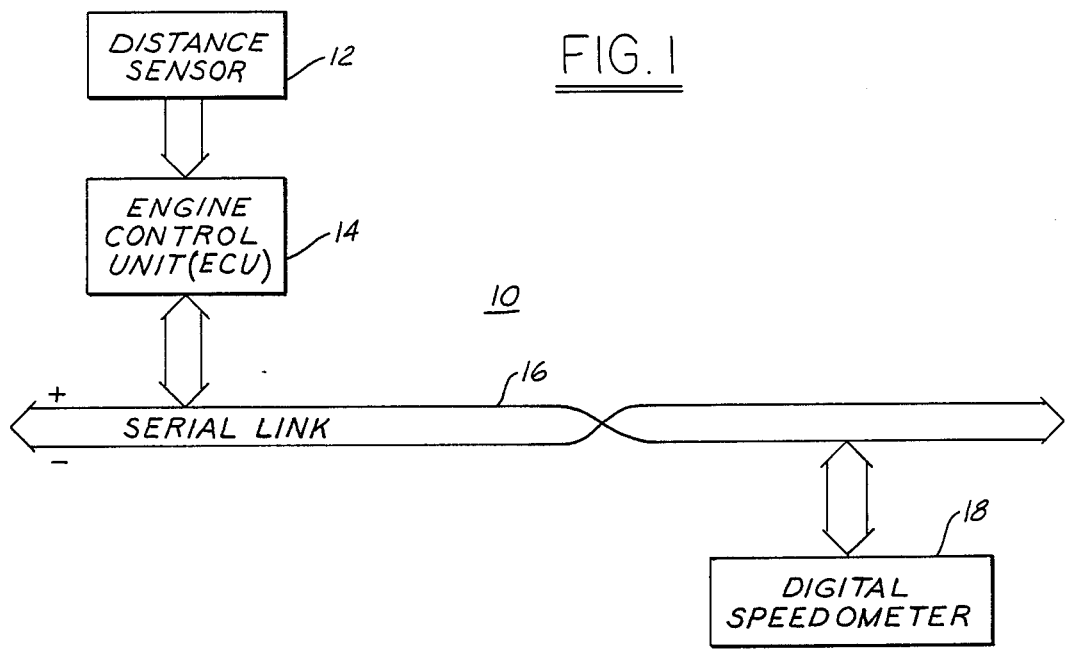
FIG. 1 is a block diagram of serial data communications bus network which sets the operating environment for the electronic digital speedometer system according to the invention.

FIG. 1 is a block diagram of a preferred embodiment of a serial data communications network 10 that includes the electronic digital speedometer system of this invention. A distance sensor 12 is one of a plurality of transducers supplying a variety of data to an engine control unit (ECU)14. Distance sensor 12, a conventional electromechanical transducer, usually mounted on a portion of a drive train of a vehicle acts as a ground switch providing a series of on and off ground switch closures at a defined rate, e.g., 8000 switch closures per mile traveled to an input port of a computer circuit (not shown) in ECU 14.

The computer circuit in ECU 14 increments a counter which counts the switch closures and then converts them into sequential counts/time data before transmitting this information along with other data over a serial link 16 in a chosen message format. The converted counts/time data in this embodiment consists of a message identification (ID) byte and a data byte used to designate a digital number of a value proportional to the distance the vehicle travels during predetermined time intervals.

Standard universal asynchronous receiver transmitters (UARTS) and noreturn-to-zero (NRZ) coding are used to move data over the link. However other alternative codes such as NRZ inverted and Manchester coding may also be used. The UART module converts standard digital logic level signals into NRZ coded serial data for transission over link 16.

With one UART (not shown) coupled to ECU 14 and another UART (also not shown) coupled to speedometer unit 18 communications between the two units can take place over link 16.

The coded speed data from ECU 14 is received by speedometer unit 18 as a series of bytes. ECU 14 transmits one byte of speed data over the link at a rate, e.g., of one byte every 344 milliseconds.

Figure 2:
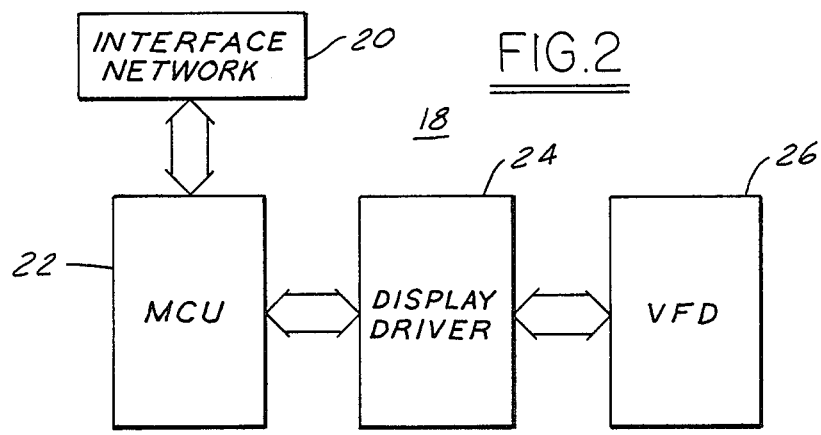
FIG. 2 is a block diagram of the electronic digital speedometer system of this invention which interfaces with the bus network.

As shown in FIG. 2, the interface network 20 of speedometer unit 18 receives the NRZ coded message serially and converts each bit of data into a parallel word. The parallel word is bussed over to a microcomputer (MCU) 22 within speedometer unit 18. MCU 22 is a conventional microcomputer such as a Motorola Device No. MC 6805, a single chip microcomputer containing a CPU, on-chip clock, ROM, RAM, input/output ports and a timing circuit. MCU 22 is programmed to perform several operations on the incoming speed data before transferring display data resulting from the several operations to a display driver circuit 24 used for driving a digital display such as a vacuum fluorescent display (VFD) 26.

An alternate embodiment might use a Motorola MC68HCO5C4 as MCU 22. This microcomputer contains an on-board UART. Thus, in that event, the interface network 20 becomes an integral part of MCU 22.

Illustratively, about every 344 milliseconds, MCU 22 is programmed to receive the speed data as an interrupt sent from the UART in the interface network 22 and to use the proper set of instructions to handle the interrupt so as to save next most recent data byte in selected RAM locations. Then the CPU of MCU 22 uses another set of instructions to condition the stored data and the most recent speed data byte in a novel manner before other instructions provide for communicating updated display information to VFD 26.

Before explaining the signal conditioning, the various constraints on system 10 should be mentioned. Firstly, the processing time of the microprocessor located in ECU 14 which controls ECU action is limited. Thus, speed data is transferred from ECU 14 over link 16 only during a certain time interval. Secondly, link 16 is band limited. Link 16 being essentially a twisted pair of wires, is restricted with respect to the rate data is transferred. It cannot be driven at very high frequency rates. No more than 10 kilobits/seconds of data can be transferred over link 16. Thirdly, VFD 26 cannot be updated continuously. Thus, a satisfactory update rate of the display must be used. Fourthly, there is a need for a sufficient resolution of the speed information being supplied by ECU 14, i.e., the smallest increment of speed being measured and displayed with certainty should produce a readable change in the display, and fifthly, display flicker must be kept to a minimum.

To appreciate these constraints, consider the 8000 switch closures or counts which are equivalent to one (1) mile of travel of the vehicle, ECU 14 counts the switch closures and transmits, synchronously, an accumulation of the counts or speed data over link 16 within a 344 ms interval. Since the switch closures are processed to develop a measure of vehicle speed and since the data is conveyed as a digital number only to speedometer unit 18 over link 16 which has a limited band width at a rate commensurate with the update cycle of the display, the distance data being transferred synchronously within an interval e.g. 344 ms, must be translated into miles/hr information. This translation shown in the following equation (1) provides conversion factor:

$$\frac{\frac{1 \text{ Mile}}{8000 \text{ counts}} \quad \frac{3600 \text{ sec}}{1 \text{ hr.}}}{0.344 \text{ sec}} = 1.30814 \text{ miles/hr/count} \quad (1)$$

Noting equation (1), the criterion of whether resolution is sufficient depends on the value of the conversion factor. If the value of a single count is less than or equal to one (1) then the resolution is sufficient since a single integer value of speed can clearly be detected and displayed with certainty. Then, the resolution will be less than one mile per hour and speedometer unit 18 can guarantee displays of each possible mi/hr. If the value for the single count is greater than one (1) as it is in equation (1) then each possible mi/hr will not be detected; there will be gaps between integer values displayed by speedometer 18. The time interval of the speed data over link 16 is not sufficiently long to compute an accurate speed. As an example, if two (2) counts are transmitted over link 16 during one interval and one (1) count is transmitted during another interval, the 2 counts translate into being equivalent to 2×(1.30814) or 3 mi/hr when rounded off and the 1 count translates into 1×(1.30814) or 1 mi/hr when rounded off. Hence, it is impossible to display a reading of 2 mi/hr. This scenario demonstrates the lack of resolution of such a speed data acquisition system to permit computing an accurate speed.

With regard to the flicker problem, there is no fixed relationship between the time interval and the integer number transmitted over link 16. Fractional parts of the switch closures are not transmitted as speed data. This inability to provide fractions of the switch closures causes flicker, flicker being random fluctuations back and forth in the number displayed due to the gaps caused by the count translations as the above scenario demonstrates. Thus, there is a difficult problem to avoid flicker and at the same time compute an accurate speed.

To minimize the above-mentioned shortcomings or restraints of system 10, a firmware approach has been utilized to substantially eliminate flicker as well as to improve resolution. If two adjacent counts/time number values are added together, then the conversion factor becomes the average of two successive applications of the conversion factor derived in equation (1) or 0.6540697 since the data transfer interval is still 344 milliseconds which is also equivalent to the display update rate. And since two periods of counts/time data of equal weight is added together, a form of digital filtering occurs wherein only integer number data without any fractional parts are being dealt with since fractional information concerning the speed of the vehicle is removed or disregarded before the counts/time representation of distance travelled are transmitted to speedometer 18. In essence, this process of adding two consecutive counts/time number values together, the counts data is being reconstructed to include the fractional information that the individual counts of equal weight is devoid of or is lacking. Integer counts/time data is being accumulated over a long enough time span that the missing fractional part of the switch closure information does not present any condition that would influence flicker. Flicker virtually doesn't show up in the display.

Hence to implement the above operation, table 1 is pseudo code statements representative of the machine codes that the processor of MCU 22 executes to compute speed data free of gaps between integer data and in a form that minimizes display flicker. The pseudo code statements are in a form of a programming development language which provides a verbal picture of the program functions much like a flowchart. The assembly language statements (not shown) which implement the psuedo code statements may be compiled into a form commensurate with the target computer assembly language and optimized for execution speed and RAM or ROM efficiency as the system requirements dictate. A suitable conventional assembler is used to generate the machine codes. The machine codes generated from the pseudo code statements are stored in a chosen location in ROM and used as a firmware algorithm by MCU 22 to implement the control functions of the processor of MCU 22 needed to perform the operations for obtaining the derived display speeds.

In the pseudo code statements, the asterisk * denotes the beginning of a statement, the dash after the asterisk indicates the indentation level of the statement and /*comment*/defines a comment line.

TABLE I

MCU 22 EVALUATION PROCEDURE OF VEHICLE SPEED DATA FROM ECU 14

/* This program converts speed data byte words to proportional values of speed to be displayed and expressed in mph or km/hr units */
/* The evaluation procedure is performed once every period (i.e., one every 344 ms) */
/* Definitions */
/*OLDDST is the count value received by MCU 22 during the next to most recent 344 ms interval*/

TABLE I-continued

MCU 22 EVALUATION PROCEDURE OF VEHICLE SPEED DATA FROM ECU 14

/*NEWDST is the count value received by MCU 22 during the most recent 344 ms interval*/
*- While count/time values are being received, DO
*--- Wait for new distance/time byte to be sent from ECU;
*--- If U.S. Units (mph) is desired,
*----- Displayed speed/digital number = (OLDDST + NEWDST) × 0.6540697;
*--- Else, if metric units (km/hr) is desired,
*----- Displayed speed digital number = (OLDDST + NEWDST) * 1.046;
*--- Move NEWDST value to OLDDST;
*- End While *
End Program To ensure only integer numbers are displayed, conventional rounding off of a displayed digital number is performed using software such as described in Table II.

TABLE II

MCU 22 ROUNDING OFF PROCEDURE FOR DERIVED SPEED NUMBER

/* Handle each derived displayed speed number as follows:
*- Get integer and fraction portion of each derived displayed speed number.
*- If fraction greater than or = 0.5,
*--- then add 1.0 integer to integer portion of speed number;
*--- Find displayed speed = (derived speed number (integer portion) + 1.0)
*--- else, don't add 1.0 integer to integer portion of speed number;
*--- Find displayed speed = (derived speed number (integer portion only))

Each rounded-off, derived speed number is serially transferred from MCU 22 to display driver 24. Display driver 24 receives the serially presented speed number data and then converts the data into parallel data words. The parallel data words are applied to the multiplexed output lines connected to VFD 26 to simultaneously select the grids used to control illumination of the characters defined by the multiplexed groups of anode segments needed to display the final displayed speed.

OPERATION OF THE SYSTEM

The operation of system 10 will now be discussed. Distance sensor 12 connected to the driver train of the vehicle generates a series of grounded switch closures whenever the vehicle moves. As mentioned previously, illustratively, 8000 consecutive switch closings represent one (1) mile travelled by the vehicle. The grounded switch closures provide a pulse type signal to the ECU 14 which counts the switch closures and converts them into sequential counts/time data having a chosen message format. In this embodiment, the converted counts/time data consists of a message identification (ID) byte and a data byte. The ID byte identifies the contents of the data byte in this case counts/time. In addition to ECU 14 being connected to link 16 and communicating in both directions with speedometer 18, other devices such as a body computer unit (not shown) may also be connected to link 16 and communications between all three devices could take place at chosen intervals. The data byte is used to designate a digital number of a value proportional to the counts generation for the vehicle during predetermined time intervals.

With a UART coupled to ECU 14 and another UART serving as the interface to speedometer unit 18, ECU 14 transmits serially one byte of speed data as NRZ code over link 16 to speedometer unit 18 at a rate of about one byte every 344 milliseconds. The NRZ coded data, when received by the UART at speedometer unit 18, is converted into parallel byte representations of the counts/time message transmitted by ECU 14. Each byte represents the number of counts needed to define the distance travelled by the vehicle to the nearest integer value. The parallel byte is bused over to MCU 22 which executes the function definition algorithm used to evaluate the speed data.

About each 344 ms, MCU 22 sends a derived speed number to VFD 26 for display. VFD 26 is updated at approximately the same rate, thus the interval between successive changes in the display is in sychronization with the rate at which the data is supplied in the display. Hence, the display response is commensurate with the update rate of the display.

Flicker is virtually eliminated since the fractional components of the speed data is digitally filtered out. The measurement of speed is accurate since a sufficiently long period of time is used to obtain enough speed information to obtain speed data resolution of less than one (1) mph. Thus, a change in speed of 1.0 mph can be readily detected.

To summarize the type speed data system 10 presents, refer now to FIG. 3. In the example given by FIG. 3, the vehicle is travelling at 3.2 mph. Note that during each 344 ms. time interval, distance sensor 12 outputs pulses. During the first interval, a count value of three (3), e.g., the positive edges of the pulses, are counted by ECU 14 and transmitted over the link to speedometer 18. If speed is computed using equation (1) the unfiltered speedometer method, then the computed speed value would be 4 mph (3×1.30814 miles/hr/count=3.93242). Rounding off this number, the displayed speed value would be 4 mph. Likewise, during the second, third and fourth intervals, the displayed speed values would be 3 mph, 4 mph and 3 mph, respectively. Hence, the rapid switching from a high value displayed speed value to a next low value and back to a high value will cause flicker to occur on the unfilter speedometer display.

By using the function definition algorithm in table 1, during the first interval, the count value of three is the OLDDST value. During the second interval, the count value of two is the NEWDST value. MCU 22 can rapidly perform the summing of the OLDDST and NEWDST values and multiply the sum by the mph conversion factor, 3 counts+2 counts=5 counts×0.6540697 mph/hr/count=3.2703485 mph which, when rounded off, the value to be displayed is 3 mph. This value is displayed on VFD 26 while MCU 22 is receiving the count value (2) from the third interval.

To compute the next number to be displayed, the second interval count value (2) that was the NEWDST count for the previous computation becomes the OLDDST count. The count value (3) from the third interval becomes the NEWDST count. Thus, the next value to be displayed on VFD 26 is computed by summing 2 counts+3 counts and multiplying this sum by the conversion factor (2+3)=5×0.6540697 to obtain 3.3 mph, which when rounded off, we get a value to be displayed of 3 mph.

The fourth interval's count now becomes the NEWDST count when used with the third interval count which now becomes the OLDDST count. Thus, 3+2=5×0.6540697 which=3.2 mph, which, when rounded off, we get a value to be displayed of 3 mph.

Thus, using the function definition algorithm of table 1, the speed values to be displayed during the four (4) time intervals remain 3 mph. This illustrates the effects of the invention in reducing flicker which could occur from integer data which is void of the fractional component of the counts data.

A further embodiment of this system substitutes an analog display system for the digital display of this preferred embodiment.

Display driver 24 is replaced by a D/A converter (not shown) and the VFD 26 is replaced by a conventional analog voltmeter (not shown). Still a further embodiment of system 10 includes using a shorter time interval in order to increase the number of intervals during which counts per intervals are measured. By doing this, display responsiveness is increased. A further embodiment of system 10 includes keeping the time interval the same, but using more intervals to compute the speed thus providing more resolution allowing the computation and display of finer units, for example, 0.1 miles per hour.

While the present invention has been disclosed in connection with a preferred embodiment thereof, it should be understood that there may be other embodiments which fall within the spirit and scope of the invention and that the invention is susceptible to modification, variation and change without departing from the proper scope or fair meaning of the following claims.

I claim:

1. A firmware/hardware electronic digital speedometer used with a multi-measureand data communication system for measuring and then displayed vehicle speed as digital number values on a digital display unit having a predetermined update rate, the digital number values being derived from a series of ON and OFF ground switch closure signals in proportion to the distance traveled by a vehicle provided by a distance sensor unit coupled to a drive train of the vehicle, said system comprising:

(a) first computing means connected to the distance sensor for receiving the switch closure signals, establishing a count of the number of switch closures occurring during a first time interval of series of such first time intervals as the vehicle moves and then converting each of said counts to a digital code of a chosen format at an end of each of the first time intervals, said digital code representing the number of counts per first time interval;

(b) communication means including a communications link connected to said first computing means for sequentially sending each of said digital codes over said communications link at the end of each of the first time intervals at a sending rate substantially identical to the update rate of the display;

(c) second computing means connected between said communication means and the display for receiving in a first register each of said digital codes sent over said communications link at the sending rate; for storing a next most recent digital code in a second register while a most recent digital code is being received by said first register; for multiplying by a first conversion factor a sum total number value of a number representation of said most recent digital code added to a number representation of said next most recent code to compute a speed number value to be displayed and for providing the display unit during a second time interval with the current computed speed number at a rate substantially identical with the update rate of the display until another most recent digital code is received by the first register during the next computation of the speed numbers;

the summing of the digital codes being performed in a chosen manner to provide integer speed numbers, the integer speed numbers being supplied to the display unit in a manner that strikes a balance between updating the display unit slowly enough to make the displayed digital numbers readable and quickly enough to make the display unit responsive to changes in vehicle speed, the display of the speed numbers being kept suitably stable so that the digits in the display do not appear to indiscriminately jump around when no change in vehicle speed is apparent.

2. Apparatus of claim 1 wherein said first conversion factor provides miles per hour speed number values to be displayed, wherein the computed speed numbers are rounded off to ensure that only integer numbers are displayed.

3. Apparatus of claim 2 wherein another conversion factor is substituted for said first conversion factor to provide kilometers per hour speed number values to be displayed.

4. Apparatus of claim 1 wherein said digital display is a vacuum fluorescent display.

5. Apparatus of claim 1 including means for displaying analog indications of said derived speed number values.

6. Apparatus of claim 1 wherein the computing of said speed number value is accomplished by summing at least two first time intervals of the counts of switch closures and then applying the first conversion factor to the sum to obtain the miles per hour speed number values, and wherein the first conversion factor is applied to the sum of the two counts within another first time interval, wherein the first time interval being substantially identical to the update rate of the display and wherein the update rate of the display unit and the first time interval equals approximately 344 milliseconds, wherein the speed numbers are transferred from said first computing means to said second computing means after the termination of one first time interval at a rate commensurate with the update rate of the display unit and wherein said communication link of said communications means is a time shared link in which the digital codes is only one of the many measurands placed on said link.

7. A firmware/hardware method for measuring and then displaying vehicle speed as digital number values on a digital display having a predetermined update rate derived from a series of ON and OFF ground switch closure signals in proportion to the distance traveled by a vehicle provided by a distance sensor unit coupled to a drive train of the vehicle, said method comprising the steps of:

(a) at a first computing means, establishing a count of the number of switch closures occurring during a first time interval of a series of such first time interval of a series of such first time intervals as the vehicle moves;

(b) converting each of said counts to a digital code of a chosen format at an end of each of said time intervals, said digital code representing the number of counts per time interval;

(c) sequentially sending each of said digital codes over a communications link at the end of each first time interval at a sending rate substantially identical to the update rate of the display;

(d) at a second computing means connected between said communication link and the display, receiving in a first register each of said digital codes sent over said communications link at the sending rate;

(e) storing a next most recent digital code in a second register while a most recent digital code is being received by said first register;

(f) multiplying by a first conversion factor a sum total number value of a number representative of said most recent digital code added to a number representation of said next most recent code to compute a speed number value to be displayed; and (g) providing the display with the current speed numbers at a rate substantially identical with the update rate of the display during a second time interval until another most recent digital code is received by said first register during the next computation of the speed numbers, the summing of the digital codes being performed in a chosen manner to provide integer speed numbers, the integer speed numbers being supplied to the display unit in a manner that strikes a balance between updating the display unit slowly enough to make the displayed digital numbers readable and quickly enough to make the display unit responsive to changes in vehicle speed, the display of the speed numbers being kept stable enough so that the digits do not appear to indiscriminately jump around when no change in vehicle speed is apparent.

8. Method of claim 7 wherein said first conversion factor provides miles per hour speed number values to be displayed, wherein the computed number is rounded off to ensure that only integer numbers are displayed.

9. Method of claim 8 wherein another conversion factor is substituted for said first conversion factor to provide kilometers per hour speed number values to be displayed.

10. Method of claim 7 including means for displaying digital number values wherein said digital display is a vacuum fluorescent display.

11. Method of claim 7 including means for displaying analog indications of said derived speed number values.

12. Method of claim 7 wherein the computing of said speed number values are accomplished by summing at least two first time intervals of the counts of switch closures and then applying the first conversion factor to obtain the miles per hour speed number value, and wherein the first conversion factor is applied to the sum of the two counts within another first time interval, the first time interval being substantially identical to the update rate of the display and wherein the update rate of the display and the first time interval being equal to 344 milliseconds.

* * * * *